(12) United States Patent
Krolski et al.

(10) Patent No.: US 12,415,690 B2
(45) Date of Patent: *Sep. 16, 2025

(54) TRUSSED RAMP

(71) Applicant: Motis, LLC, Germantown, WI (US)

(72) Inventors: Robert Krolski, Kewaskum, WI (US); Carl Richter, Menomonee Falls, WI (US); Clint Berry, Rapid River, MI (US)

(73) Assignee: Motis, LLC, Germantown, WI (US)

( * ) Notice: Subject to any disclaimer, the term of this patent is extended or adjusted under 35 U.S.C. 154(b) by 1011 days.

This patent is subject to a terminal disclaimer.

(21) Appl. No.: 17/376,737

(22) Filed: Jul. 15, 2021

(65) Prior Publication Data

US 2022/0017315 A1   Jan. 20, 2022

Related U.S. Application Data

(60) Provisional application No. 63/143,497, filed on Jan. 29, 2021, provisional application No. 63/052,677, filed on Jul. 16, 2020.

(51) Int. Cl.
   *B65G 69/30* (2006.01)

(52) U.S. Cl.
   CPC .................................. *B65G 69/30* (2013.01)

(58) Field of Classification Search
   CPC ...................................................... B65G 69/30
   USPC ................................................ 14/69.5–74.5
   See application file for complete search history.

(56) References Cited

U.S. PATENT DOCUMENTS

| | | | |
|---|---|---|---|
| 2,141,529 A | 12/1938 | Gravelle | |
| 3,184,773 A | 5/1965 | Breneman | |
| 3,517,791 A | 6/1970 | Miles | |
| 3,691,576 A | 9/1972 | Miles | |
| 3,984,891 A | 10/1976 | Weinmann | |
| 3,984,961 A * | 10/1976 | Chieger | E04B 5/10 52/579 |
| 4,723,758 A | 2/1988 | Gehrig | |
| 4,853,999 A * | 8/1989 | Smith | B65G 69/287 14/69.5 |
| 4,912,796 A | 4/1990 | Crump | |
| 5,033,147 A * | 7/1991 | Svensson | E01D 19/125 52/483.1 |
| 5,277,436 A | 1/1994 | Frank | |
| 5,651,154 A * | 7/1997 | Ahlskog | E01D 19/125 52/588.1 |
| 5,781,953 A | 7/1998 | Winter | |
| 5,903,943 A * | 5/1999 | Sherrod | B65G 69/287 52/592.1 |
| 5,938,397 A | 8/1999 | Schouest | |
| 6,009,587 A | 1/2000 | Beeman | |
| 6,267,082 B1 | 7/2001 | Naragon | |

(Continued)

*Primary Examiner* — Raymond W Addie
(74) *Attorney, Agent, or Firm* — Andrus Intellectual Property Law, LLP

(57) ABSTRACT

A ramp includes an extruded beam extending between a first end and a second end. The beam includes a first plate and a second plate opposite the first plate. A first side wall and a second side wall each extend between the first plate and the second plate. A first brace wall extends from a first corner to the first plate. The first corner is between the second plate and the first side wall. A second brace wall extends from a second corner to the first plate. The second corner is between the second plate and the second side wall.

17 Claims, 10 Drawing Sheets

(56) References Cited

U.S. PATENT DOCUMENTS

| | | | | |
|---|---|---|---|---|
| 6,345,950 | B1 | 2/2002 | William | |
| 6,389,629 | B1 | 5/2002 | Schouest | |
| 6,430,769 | B1 | 8/2002 | Allen | |
| 6,533,251 | B1 | 3/2003 | Abbaticchio | |
| 6,739,106 | B2 * | 5/2004 | Curatolo | E04F 15/10 52/592.1 |
| 6,874,766 | B2 | 4/2005 | Curatolo | |
| 7,104,524 | B1 | 9/2006 | Hidding | |
| 7,178,303 | B2 * | 2/2007 | Aota | B23K 20/122 52/582.1 |
| 7,179,042 | B1 | 2/2007 | Hartmann | |
| 7,225,492 | B2 * | 6/2007 | Pratt | A63C 19/10 472/89 |
| 7,299,517 | B1 | 11/2007 | Adinolfe | |
| 7,302,725 | B2 | 12/2007 | Thygesen | |
| 7,520,104 | B2 * | 4/2009 | Aota | B23K 33/00 228/2.1 |
| D602,673 | S | 10/2009 | Allen | |
| 7,607,186 | B1 | 10/2009 | Mitchell | |
| 7,694,375 | B2 | 4/2010 | Twedt | |
| 7,930,788 | B1 | 4/2011 | Beilstein | |
| 7,950,094 | B2 * | 5/2011 | Bailie | B60P 1/43 14/69.5 |
| 8,061,943 | B1 | 11/2011 | Beilstein | |
| 8,347,439 | B1 | 1/2013 | Beilstein | |
| 8,448,278 | B1 | 5/2013 | Beilstein | |
| 8,534,952 | B2 | 9/2013 | Vladislavic | |
| 8,813,289 | B1 | 8/2014 | Clark | |
| 9,863,103 | B2 * | 1/2018 | Osberg | E01D 19/12 |
| 10,000,146 | B2 | 6/2018 | Vipond | |
| 10,029,742 | B2 | 7/2018 | Evans | |
| 10,710,824 | B2 | 7/2020 | Krolski et al. | |
| 12,162,703 | B2 * | 12/2024 | Krolski | B23K 26/26 |
| 2002/0098071 | A1 | 7/2002 | Henderson | |
| 2003/0182740 | A1 | 10/2003 | Schmaltz | |
| 2004/0083562 | A1 | 5/2004 | Leblanc | |
| 2004/0111814 | A1 | 6/2004 | Allen | |
| 2005/0051762 | A1 | 3/2005 | Giralt | |
| 2007/0234491 | A1 | 10/2007 | Bailie | |
| 2008/0142772 | A1 | 6/2008 | Amendola | |
| 2008/0179580 | A1 | 7/2008 | McGinness | |
| 2008/0201874 | A1 * | 8/2008 | Coyle | E01C 11/24 14/71.1 |
| 2009/0016865 | A1 | 1/2009 | Astor | |
| 2014/0119814 | A1 * | 5/2014 | Osikowicz | B23K 20/1225 228/2.1 |
| 2015/0013081 | A1 | 1/2015 | Breeden, III | |
| 2015/0074924 | A1 | 3/2015 | Bernart | |
| 2017/0275886 | A1 | 9/2017 | Ueno | |
| 2023/0220676 | A1 | 7/2023 | Matsushita | |
| 2023/0235565 | A1 | 7/2023 | Matsushita | |

\* cited by examiner

TRUSSED RAMP

CROSS-REFERENCE TO RELATED APPLICATIONS

The present application claims priority of U.S. Provisional Patent Application No. 63/052,677, filed on Jul. 16, 2020, and claims priority of U.S. Provisional Patent Application No. 63/143,497, filed on Jan. 29, 2021. The contents of which are both incorporated by reference herein in their entireties.

FIELD

The present disclosure relates to cargo loading and transportation and specifically to ramps configured for loading and unloading trucks and trailers.

BACKGROUND

Ramps allow vehicles and cargo to be loaded onto open or enclosed trailers. Load levelers support loads above open drop deck semi-trailers. U.S. Pat. Nos. 7,930,788 and 8,347,439 disclose examples of combination ramp and load levelers. U.S. Pat. No. 8,448,278 discloses examples of a ramp. U.S. Pat. No. 8,061,943 discloses examples of a load leveler. Each of U.S. Pat. Nos. 7,930,788; 8,061,943; 8,347,439; and 8,448,278 are incorporated herein by reference in their entireties.

This Background is intended to introduce various aspects of the art, which may be associated with the present disclosure to thereby assist in providing a framework to facilitate a better understanding of particular aspects of the present disclosure. Accordingly, it should be understood that this Background should be read in this light, and not necessarily as admissions of prior art.

BRIEF DISCLOSURE

An example of a ramp includes an extruded beam extending between a first end and a second end. The beam includes a first plate and a second plate opposite the first plate. A first side wall and a second side wall each extend between the first plate and the second plate. A first brace wall extends from a first corner to the first plate. The first corner is between the second plate and the first side wall. A second brace wall extends from a second corner to the first plate. The second corner is between the second plate and the second side wall.

In examples, the first plate is a top plate and the second plate is a bottom plate. The first corner is a corner between the first sidewall and the bottom plate and the second corner is a corner between the second sidewall and the bottom plate. The first and second brace walls meet at the midpoint of the top plate. The first side wall includes a tongue that extends lengthwise along the first side wall outwardly away from the second side wall. The second side wall includes a groove extending lengthwise along the second side wall. The tongue has a first dimension to fit within a second dimension of the groove.

In additional examples, the center wall extends between the first plate and the second plate, wherein the center wall is equidistant between the first side wall and the second side wall. The center wall is parallel to the first side wall and the second side wall. A third brace wall connects to the first plate and a fourth brace wall connects to the first plate. The third brace wall extends from a third corner to the first plate, the third corner being between the center wall and the second plate. The fourth brace wall extends from a fourth corner to the first plate, the fourth corner being between the center wall and the second plate. The first brace wall connects to the third brace wall at the first plate and the second brace wall connects to the fourth brace wall at the first plate.

In further examples, the first end is orthogonal to the first plate and the second end is orthogonal to the first plate. A first end piece is secured about the first end and engages at least one of the first plate or the second plate. A second end piece is secured about the second end and engages at least one of the first plate or the second plate. The first end piece may be a first end hook and the second end piece may be a second end hook. A textured surface may be secured to the first plate. The first plate may include grooves that define ribs and the grooves further define dovetails into the ribs. The textured surface may include an adhesive or an epoxy, and the adhesive or epoxy solidifies within the dovetails to form a mechanical connection between the textured surface and the first plate.

In an example of a ramp, the ramp includes first and second extruded beams that extend between a first end and a second end. Each beam includes a first plate having an exterior textured surface and a second plate opposite the first plate. Each beam includes a groove wall extending between the first plate and the second plate. The groove wall includes a groove extending into the groove wall lengthwise along an outside of the groove wall. Each beam includes a tongue wall that extends between the first plate and the second plate. The tongue wall includes a tongue extending lengthwise along the first side wall outwardly from the tongue wall in a direction away from the groove wall. Each beam includes a first brace wall that extends from a first corner to the first plate, the first corner being between the second plate and the first side wall. Each beam includes a second brace wall that extends from a second corner to the first plate, the second corner being between the second plate and the second side wall. A first end piece engages across the first ends of the first and second extruded beams. A second end piece engages across the second ends of the first and second extruded beams. The tongue of the first extruded beam is received within the groove of the second extruded beam to connect the first extruded beam to the second extruded beam in a lengthwise manner. The first extruded beam includes a first chamfered exterior corner where the tongue wall of the first extruded beam connects to the second plate of the first extruded beam. The second extruded beam includes a second chamfered exterior corner where the groove wall of the second extruded beam connects to the second plate of the second extruded beam. A weld joint secures the first extruded beam to the second extruded beam. The weld joint is located between the first chamfered exterior corner and the second chamfered exterior corner.

In additional examples of the ramp, the first and second extruded beams each further include a center wall, a third brace wall, and a fourth brace wall. The center walls extend between the first plate and the second plate and are equidistant between the respective groove wall and the tongue wall. The third brace wall extends from a third corner to the first plate, the third corner being between the center wall and the second plate. The fourth brace wall extends from a fourth corner to the first plate, the fourth corner being between the center wall and the second plate. The first brace wall connects to the third brace wall at the first plate and the second brace wall connects to the fourth brace wall at the first plate. The first end piece includes first shelf that engages the second plate of the first and second extruded beams and the second end piece includes a second shelf that engages the second plate of the first and second extruded beams. The exterior textured surfaces of the first and second extruded beams is a continuous textured surface across the respective first plates of the first and second extruded beams.

BRIEF DESCRIPTION OF THE DRAWINGS

The present disclosure is described with reference to the following Figures. The same numbers are used throughout the Figures to reference like features and like components.

DETAILED DISCLOSURE

Figure 1:
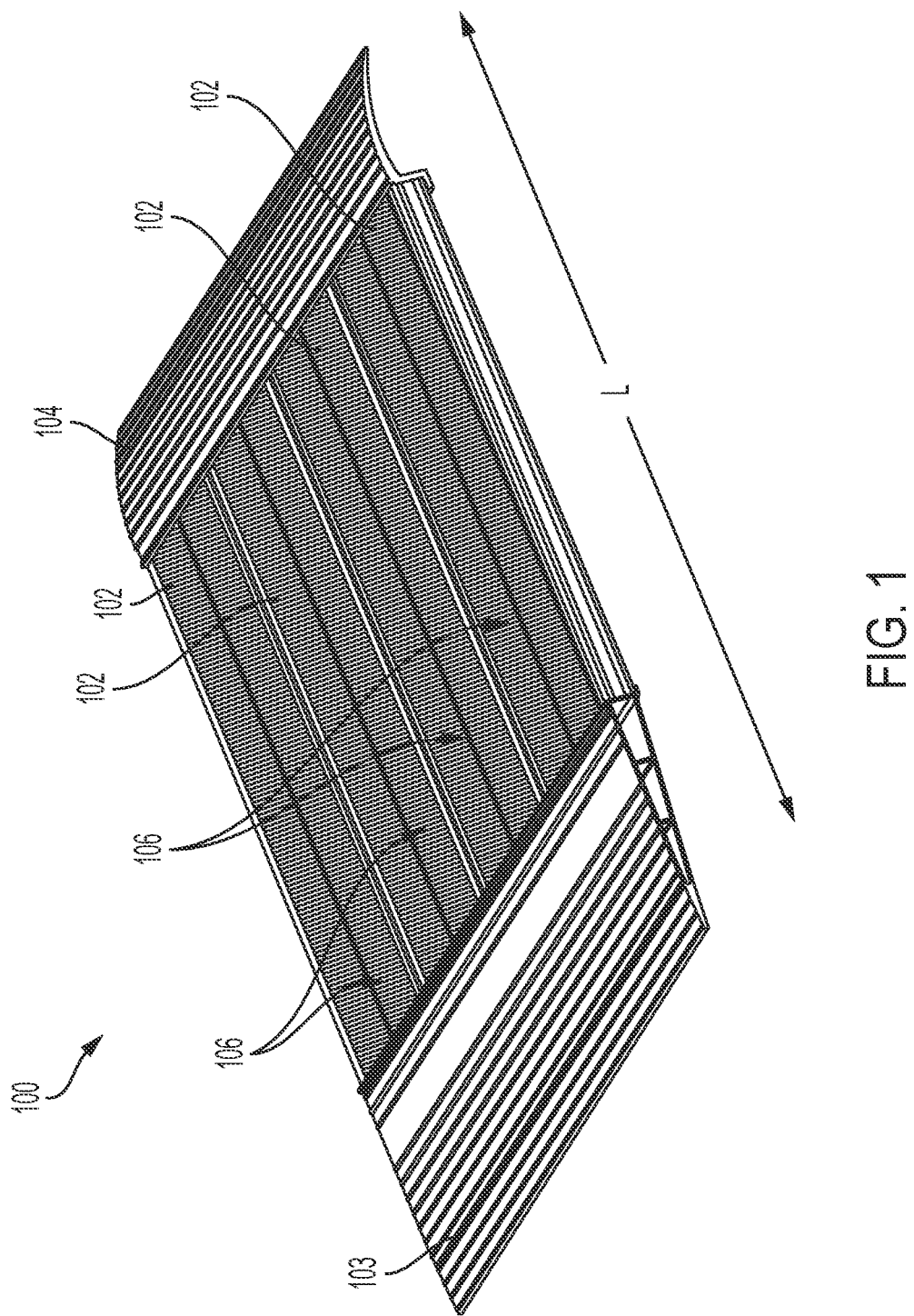
FIG. 1 is a perspective view of an example of an apparatus within the present disclosure.

FIGS. 1-8 depict examples of the apparatus 100 as disclosed herein. The apparatus 100 is exemplarily a ramp. The apparatus 100 is constructed of one or more beams 102 arranged side-by-side and extend for the length dimension L of the apparatus 100. The side-by-side arrangement of the beams 102 will be described in further detail herein. The apparatus 100 includes a ramp end 103 and a hook end 104 secured, for example, by welding or adhesive, across the ends of the beams 102. While the apparatus 100 is depicted with two different ends 103, 104, in other examples, the ends 103, 104 can be symmetrical, thus making the overall apparatus symmetrical across both the length dimension and the width dimension.

Each beam 102 may include a textured surface 106. The textured surface 106 may be a grit surface applied with an adhesive. The grit surface may be an acrylic, epoxy, or polymer coating that contains grit and is applied to the surfaces of the beams 102. The textured surface 106 may also be formed in the beam 102 as part of the extrusion process or may be machined or chemically etched into the surface of the beam 102. While not depicted in the apparatus of FIG. 1, the textured surface may further include rods or bars welded across one or more beams in the width dimension.

Figure 2:
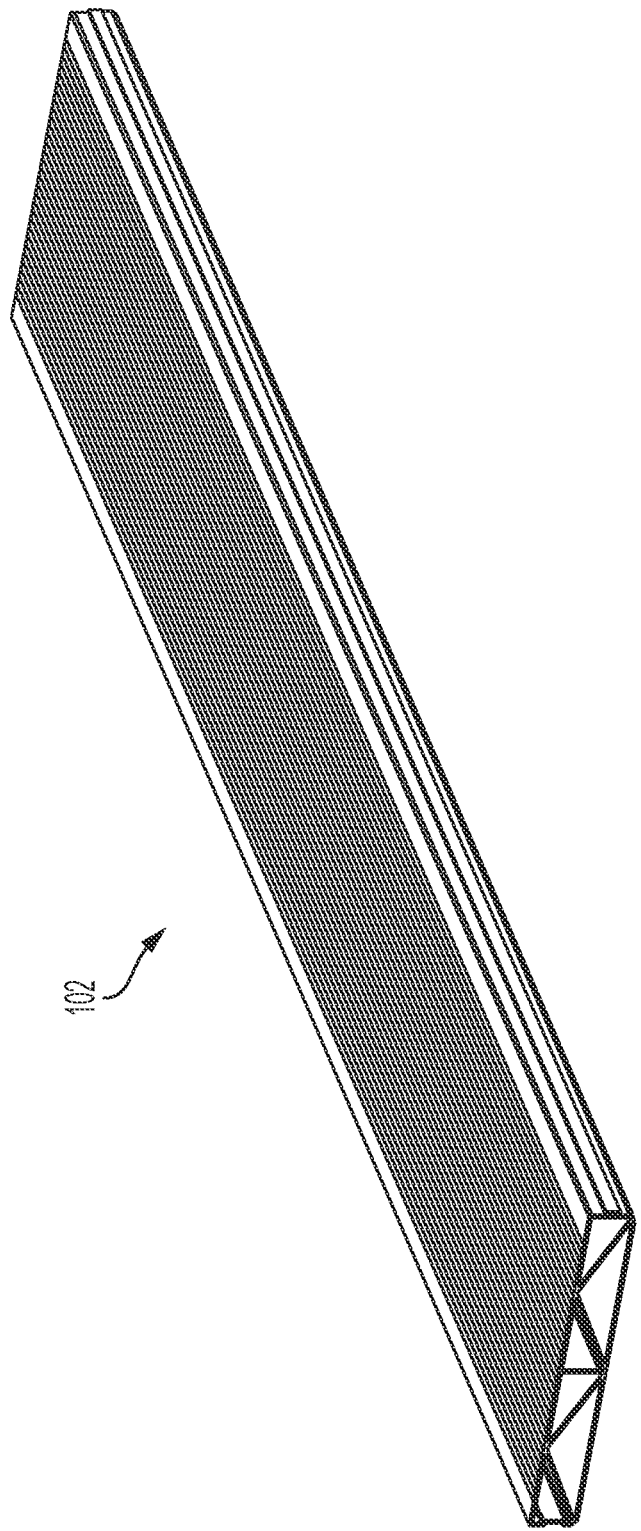
FIG. 2 is a perspective view of a beam of the apparatus of FIG. 1.

FIG. 2 provides a view of the apparatus 100 without the ends 103, 104. In this view the interior structure of the beams 102 can be seen as well as that the beams 102 are interconnected along the length dimension (L) at the adjacent sides of the beams 102. In an example, the apparatus 100 is exemplarily constructed of four adjacently aligned beams 102. In a still further example, each of the beams 102 is 9 inches in the width dimension for an overall width of the apparatus 100 of 36 inches.

Figure 3:
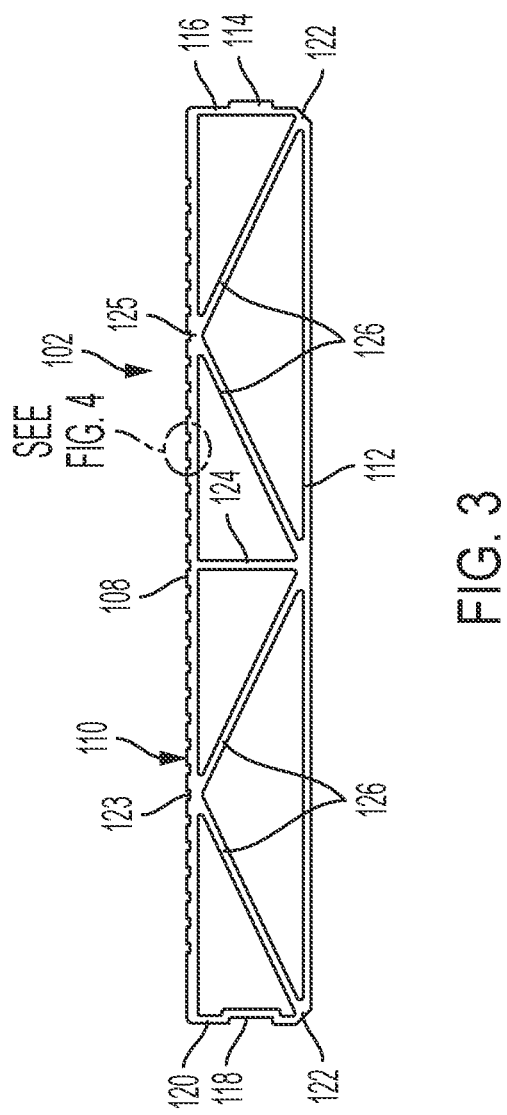
FIG. 3 is a cross-sectional view of a beam in an example of the apparatus.

FIG. 3 is a detailed end view of an example of a beam 102. The beam 102 includes a top plate 108 which may include a surface texture as described above. In a still further example, the top plate 108 of the beam includes texturing, for example, ribs 110 that are adapted to form a bond with the aforementioned textured coating comprised of e.g. acrylic, epoxy, or polymer materials. The beam 102 further includes a bottom plate 112. It will be recognized that the beam 102 can be manufactured as an extrusion, for example of aluminum. In such an example, the view shown in FIG. 3 may be the shape of such an extrusion.

The beam 102 differs from other beams as described herein in a number of ways. The beam 102 includes opposed side walls, however, a tongue 114 extends from a tongue wall 116 and a groove 118 extends into a groove wall 120. The tongue wall 116 and groove wall 120 extend the length of the beam 102 in the length dimension. The tongue 114 extends for the length of the tongue wall 116 and the groove 118 extends for the length of the groove wall 120. The tongue wall 116 connects to the bottom plate 112 at a chamfered corner 122 and the groove wall 318 connects to the bottom plate at a chamfered corner 122. These features will be described in further detail subsequently herein.

The beam 102 further includes a center wall 124 that extends between the top plate 108 and the bottom plate 112. Brace walls 126 angle between the top plate 108 and the bottom plate 112. The brace walls 126 exemplarily connect to the top plate 108 and/or the bottom plate 112 at three locations, at the respective side walls (e.g. tongue wall 116 and groove wall 120), at the center wall 124, and at a mid-point 125 between the center wall 124 and the respective tongue wall 116 or the groove wall 120. In one example, the beam 102 is 1.2" high and 9" wide. As shown in FIG. 2, the brace walls 126 connect to the bottom plate 112 at the tongue wall, 116, the center wall 124, and at the groove wall 120, while the brace walls 126 connect to the top plate 108 at the midpoints between the center wall 124 and the respective tongue wall 116 and groove wall 120. In such an example, brace walls 126 divide the beam 102 into quarters and engage either the top plate 108 or the bottom plate every 2.25". In this manner the brace walls 126 form triangles within the interior of the beam 102 between either the top plate 108 or bottom plate 112 and two of: tongue wall 116, groove wall 120, center wall 124, and brace walls 126.

Figure 4A:
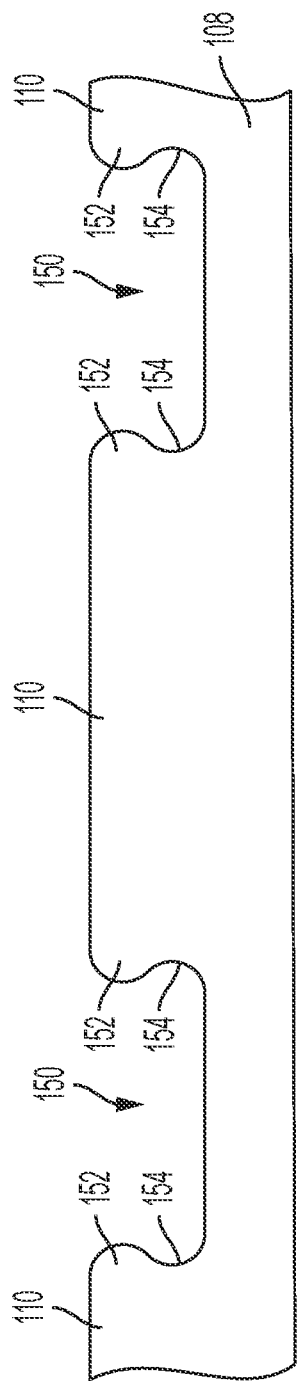
FIG. 4A is a detailed view of a top plate as denoted by line 4-4 in FIG. 3.

FIG. 4A is a detailed view of a portion of the top plate 108 of the beam 102 as denoted by line 4-4 in FIG. 3. FIG. 4A thus depicts a portion of the top plate 108 in magnified detail. The top plate 108 includes grooves 150 into the surface of the top plate 108. The grooves 150 may, for example, be constructed by extrusion or by machining. The grooves 150 define the ribs 110. The ribs 110 include overhangs 152 which each define dovetails 154 of the grooves 150.

Figure 4B:
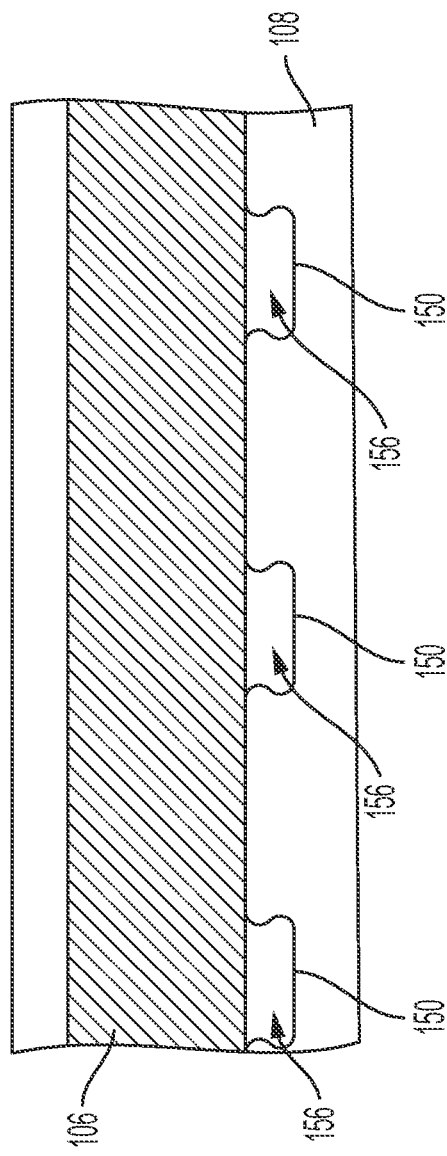
FIG. 4B depicts the detailed view of FIG. 4A with a textured surface.

FIG. 4B, depicts the top plate 108 of FIG. 4A with a coating of a texture material 156. In an exemplary embodiment the texture material is an epoxy combined with a grit media. In another example the texture material is an adhesive combined with a grit media. In an example, the grit media is coal slag. In another example, the grit media is silicon dioxide, or silica. The grit media is entrained in the epoxy to exemplarily form a slurry. The combined grit media and epoxy slurry is spread over the top plate and flows into the grooves 150 of the top plate 108 and into the dovetails 154. As the texture material 156 solidifies from slurry form to solid form, the texture material 156 within the dovetails 154 forms a mechanical connection between the texture material 156 and the top plate 108 to provide the textured surface 106. In another example, the adhesive/epoxy portion of the texture material is first spread onto the top plate 108, and then the grit media is placed into the adhesive/epoxy portion of the texture material before the adhesive/epoxy portion dries/cures, the adhesive/epoxy portion is thus secured to the grit media and to the top plate 108 to form the textured surface 106 in the manner previously described.

Figure 5:
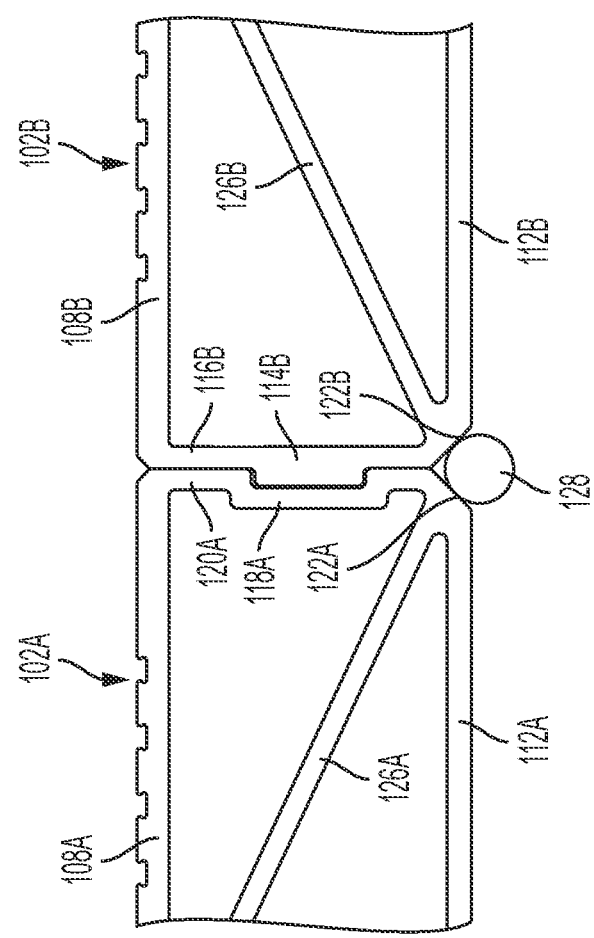
FIG. 5 is a detailed magnified view of a joint between two beams in an example of the apparatus.

FIG. 5 is a close-up detail of two beams 102A, 102B connected to one another. It can be seen from FIG. 5 that the beams 102A, 102B are connected along their lengthwise dimension by engagement between lateral walls. That is groove wall 120A engages with tongue wall 116B. The tongue 114B is received within the groove 118A. This serves two functions within the apparatus 100. First, it aligns the beams 102A, 102B during assembly and helps to keep the beams 102A, 102B in alignment as a bead 128 is welded between the beams 102A and 102B within the chamfered corners 122A, 122B. Secondly, once assembled, the overlap of portions of the adjacent beams with the tongue 114B within the groove 118A transfers load between the beams to improve the overall strength of the apparatus 100 and to resist twist between the different beams 102 of the apparatus 100.

Figure 6:
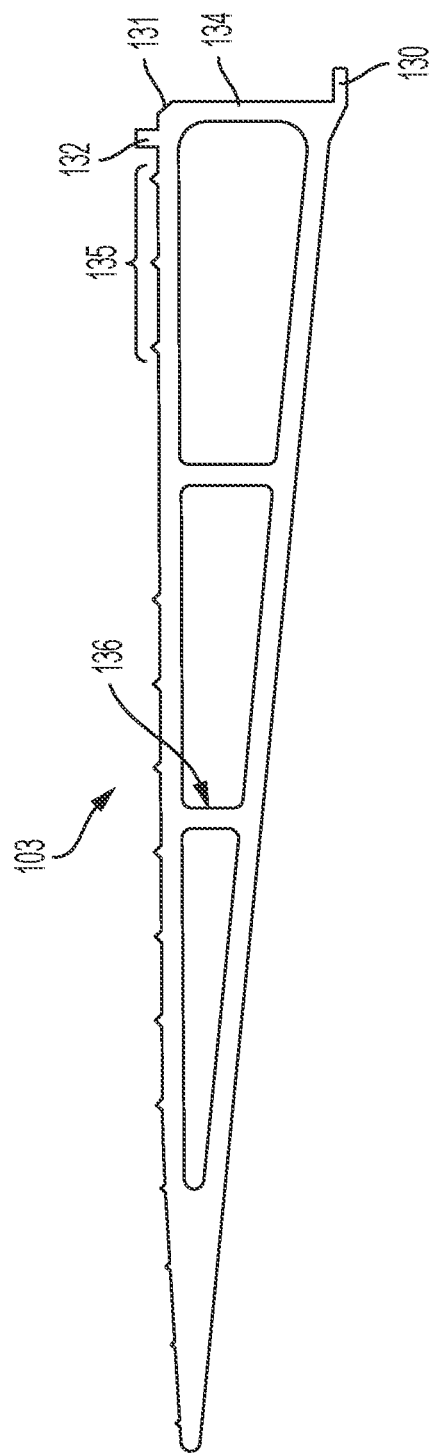
FIG. 6 is a side view of an example of an end piece for use with an example of the apparatus.
Figure 7:
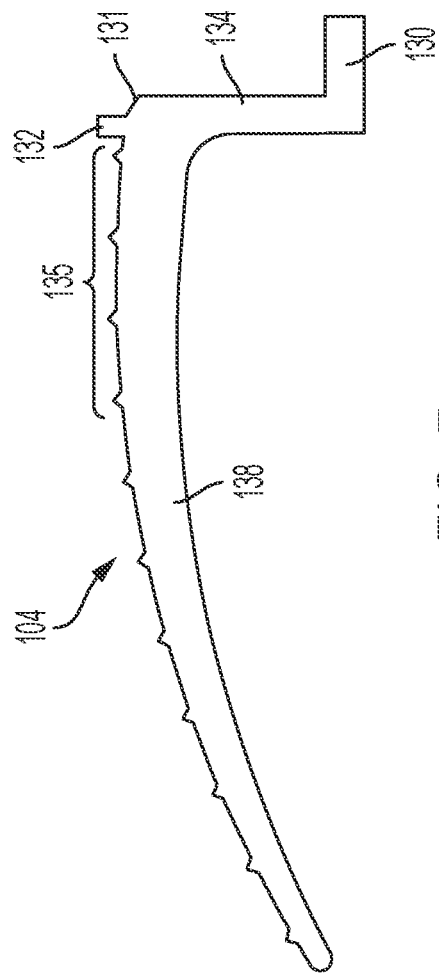
FIG. 7 is a side view of an example of a further end piece for use with an example of the apparatus.

FIGS. 6 and 7 provide respective examples of end pieces 103, 104 as may be used with the beams 12 to form the apparatus 100. FIG. 6 is a side view of an example of a foot end 103 and FIG. 7 is a side view of an example of a hook end 104. The foot end 103 includes an extension 136, in this case in the shape of a wedge, which for example is configured to provide a transition from the ground to the beam 102 in the apparatus 100. The hook end 104 includes an extension 138, in this case having a single arcing shape, which is configured to engage an elevated position, for example a vehicle bed, loading dock, or stair landing. The extension 136 may further include ribbing 135 or other texture across the surface of the extension 136. In another example, the surface of the extension 136 may include the grit surface as previously described. The foot end 103 further includes a shelf 130 configured to engage the bottom plate 112 of each beam 102. An end cap 134 extends from the shelf 130 and is configured to extend across the open end of the beams 102. A lip 132 extends from the extension in the region about the end cap 134. The lip 132 extends in generally the same direction as the end cap 134. A chamfer 131 provides the transition from the lip 132 to the end cap 134. The foot end 103 may be configured to secure to the one or more beams 102 by friction or interference fit but may also be secured to the beams by adhesive, welding, rivets, crimping, or other manners of fastening as will be recognized from the present disclosure. In an example, a weld bead (not depicted) may extend across the foot end 103 and the beams 102 along the chamfer 131.

Figure 8:
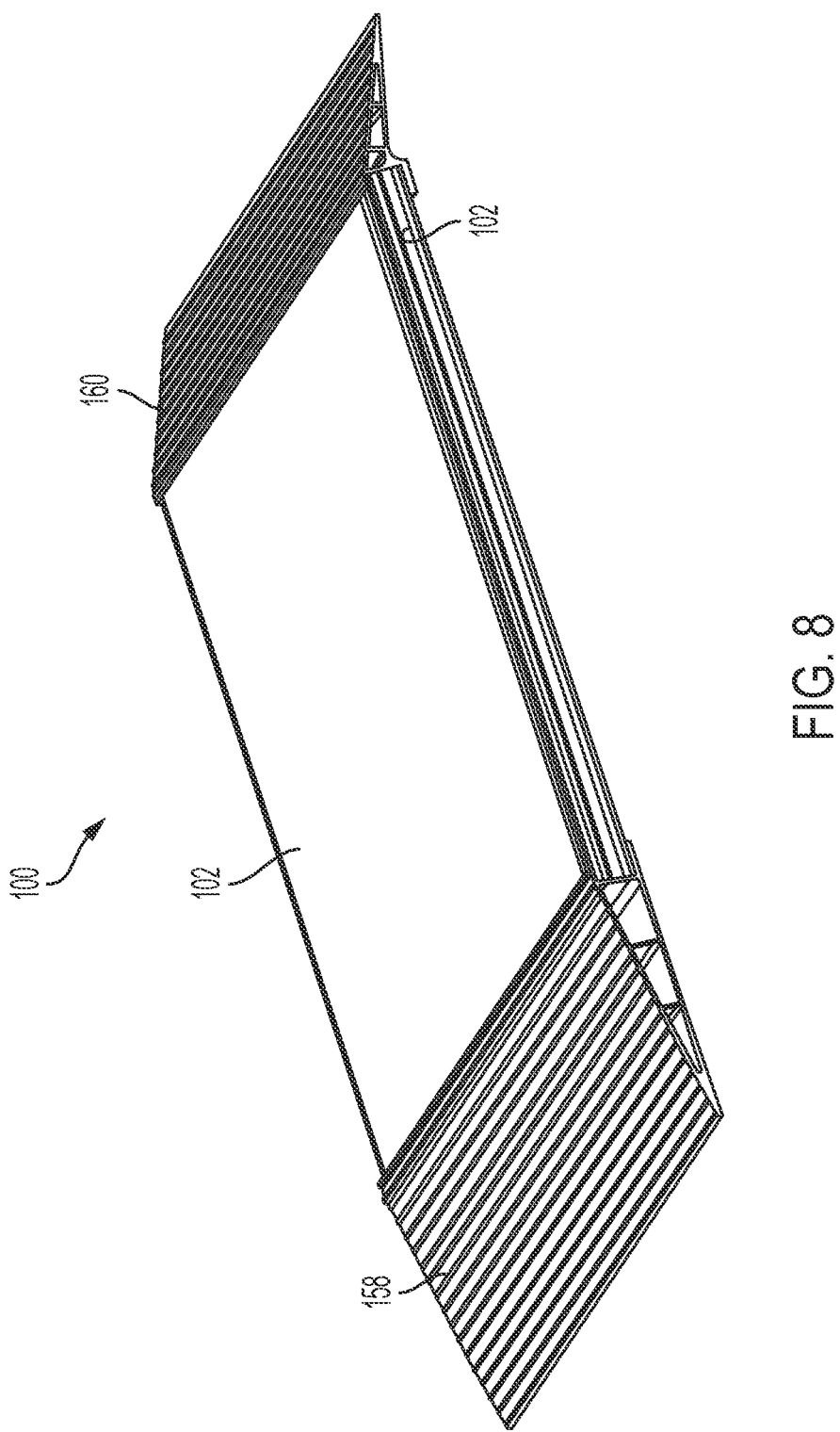
FIG. 8 is a perspective view of an example of the apparatus within the present disclosure.

FIG. 8 depicts a still further example of the apparatus 100. While like reference numerals are used to denote like features between, for example, FIGS. 1 and 8, it will be recognized that other features between these examples or other examples disclosed herein may be combined within the scope of the present disclosure. In the apparatus 100 of FIG. 8, the textured surface extends across each of the beams 102. Additionally, the apparatus 100 includes two different end pieces 158, 160. The two different constructions of the end pieces enable the apparatus 100 to lie flat relative to the bottom plate 112 with both end pieces providing ramped surfaces from the plane of the bottom plate 112 to the plane of the top plate 108. This, for example, enables the apparatus 100 to be effectively used as a bridge across a gap, for example between a trailer bed and a loading dock or platform. The different construction however further enables the apparatus 100 to better engage an elevated surface when the apparatus 100 is used as a ramp.

Figure 9:
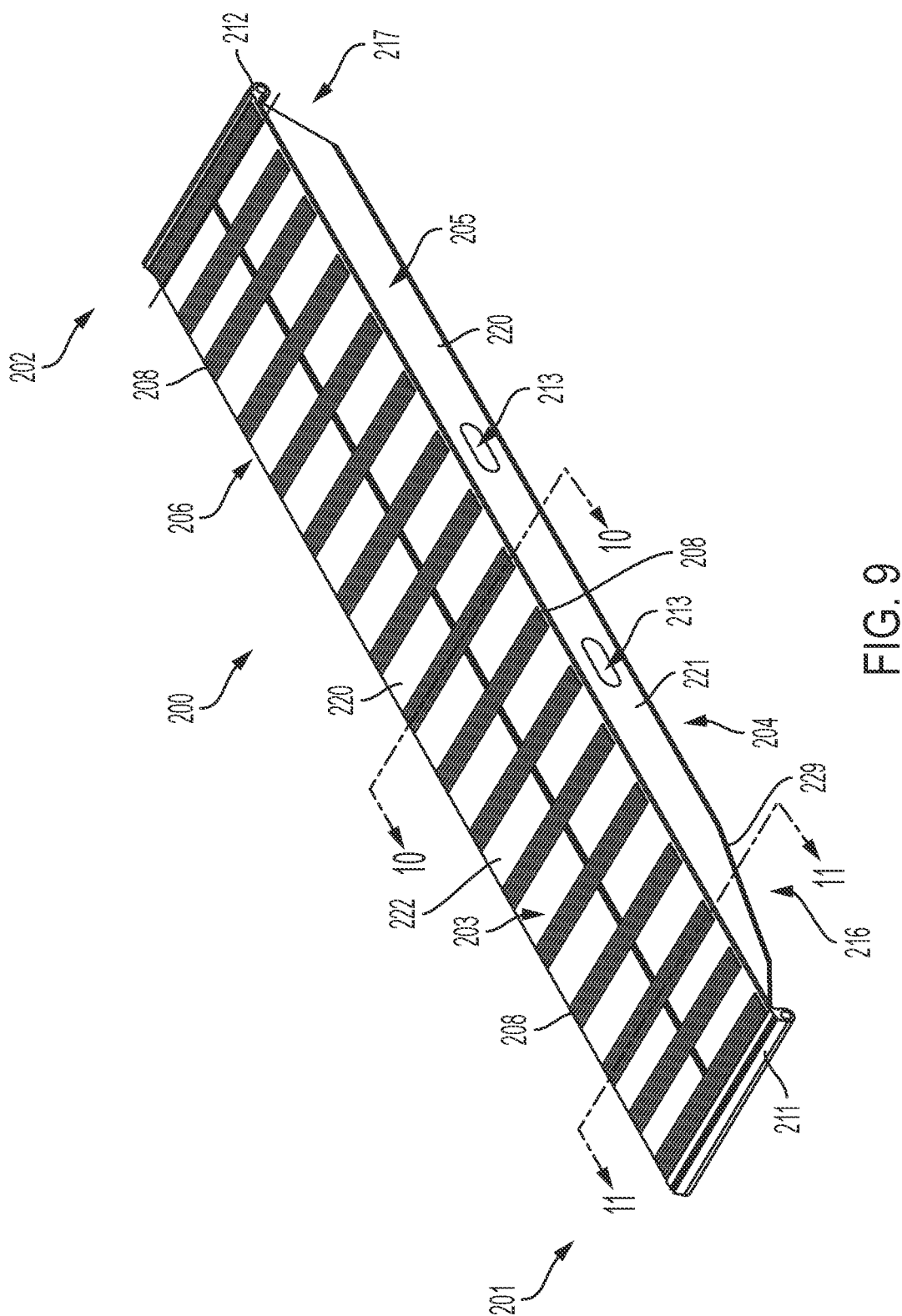
FIG. 9 is a perspective view of a further example of an apparatus within the present disclosure.
Figure 10:
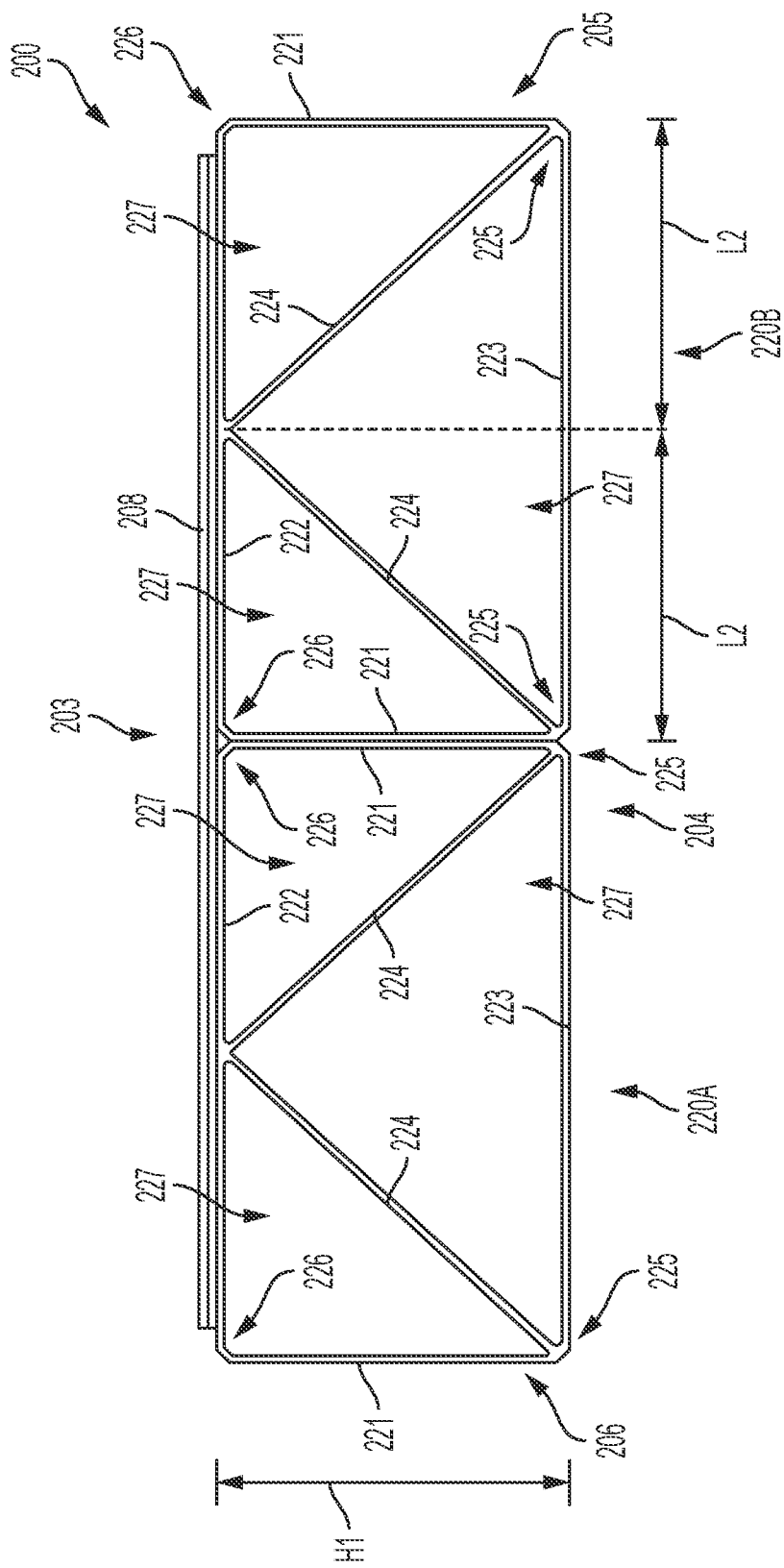
FIG. 10 is a cross-sectional view of the apparatus taken along line 10-10 of FIG. 9.
Figure 11:
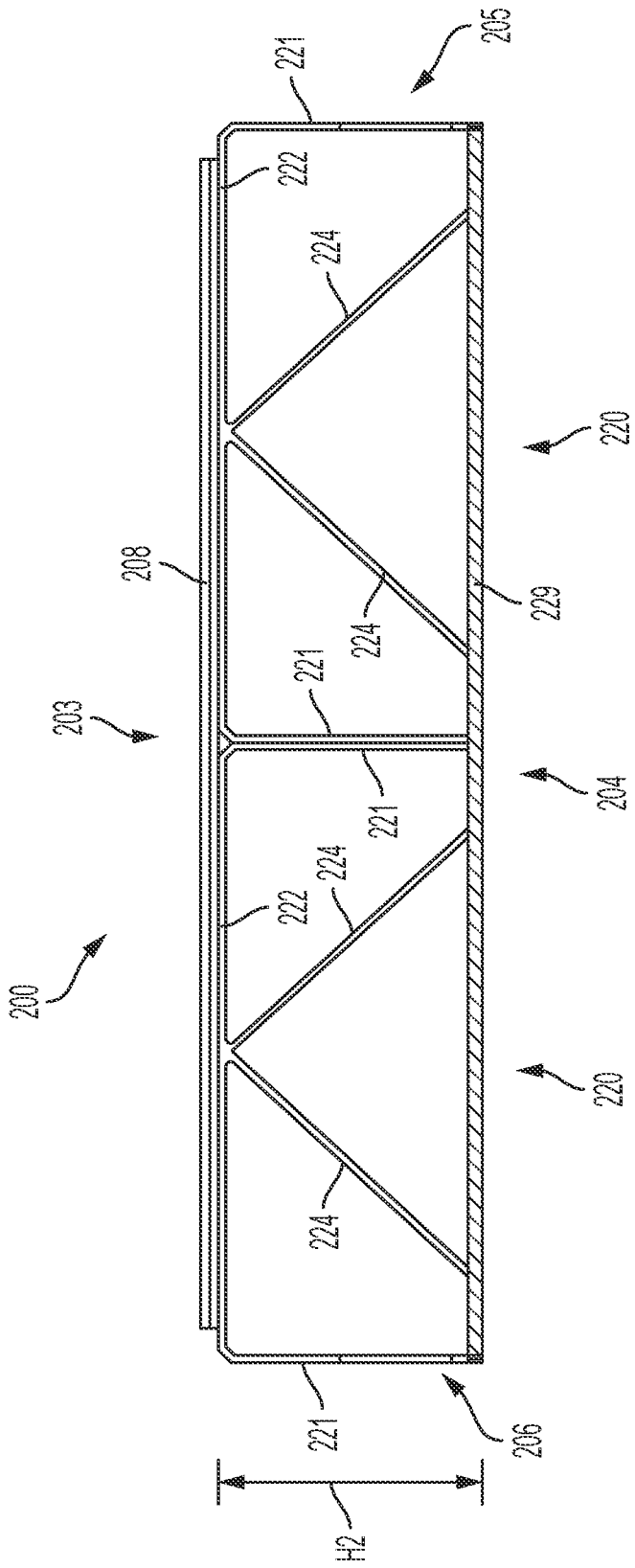
FIG. 11 is a cross-sectional view of the apparatus taken along line 11-11 of FIG. 9.

FIGS. 9-11 depict another example of the apparatus 200 of the present disclosure, the apparatus 200 takes the form of a ramp, but which may also exemplarily be used as a load leveler for a step-deck trailer. It will be recognized that the apparatus 200 as disclosed herein is merely exemplary and features of apparatus 200 may be combined with features of apparatus 100 or may include fewer features than as shown and described with respect to apparatus 100 and apparatus 200 while remaining within the scope of the present disclosure. Referring to FIG. 9, the apparatus 200 has a first end 201, an opposite second end 202, a top side 203, a bottom side 204, and a pair of opposing lateral sides 205, 206. A plurality of cross treads 208 are connected to the top side 203 with adhesives or welds, and a retention tube 211, 212 is coupled at each end 201, 202. As explained, for example, in U.S. Pat. No. 8,347,439, previously incorporated by reference, the retention tubes 211, 212 may be used to connect to a semi-trailer in either a ramp configuration or in a load leveler configuration. Openings 213 in the lateral sides 205, 206 provide handles for use by an operator when moving the apparatus 200, for example to position the apparatus into the previously described ramp configuration or load leveler configuration.

The apparatus 200 is constructed of one or more extruded beams 220 that extend continuously between the first end 201 to the second end 202. The beams 220 in an example wherein the apparatus includes more than one beam 220 (as depicted in FIG. 9, the beams 220 engage and are coupled to one another along their length dimension.

FIG. 10 is a cross-sectional view of the apparatus 200 taken along line 10-10 of FIG. 9. Each beam 220 includes opposing side walls 221. The side walls extend between a top plate 222 and a bottom plate 223. The opposing side walls 221 intersect the bottom plate 223 at corners 225 and the side walls 221 intersect the top plate 222 at corners 225. In the depicted exemplary embodiment, two adjacent beams 220 are coupled together lengthwise such that one of the side walls 221 of each beam 220 abuts the other. Preferably, the abutting side walls 221 are welded to each other. However, the abutting side walls 221 can be coupled together by other means, such as adhesives and/or mechanical fasteners (e.g., nuts and bolts, rivets). The abutting side walls 221 form a "double-wall" at the center of the beam 220 that, when the side walls 221 are secured to each other, increases the structural rigidity of the apparatus 200. When so connected, the combined beams 220 are structurally similar to the beam 220 described above. The connected side walls 221 effectively act as a combined, thickened, center wall (e.g. 124).

Brace walls 226 inwardly extend from the corners 225 and intersect with the top plate 222 such that the brace walls 226 divide the rectangular cavity of the beam 220 into separate triangular cavities 227. The brace walls 226 connect to the top plate 222 at a midpoint between the side walls 221 of the beam 220. In an example, the beam 220 has a width dimension W that is twice the height dimension H, the brace walls 226 form 45 degree angles from the respective corners 225 to the top plate 222. The brace walls 226 thus meet and form a 90 degree interior angle. The brace walls 226 increase the structural rigidity of the beam 220 by supporting the top plate 222 and distributing weight applied to the top plate 222 or the side walls 221. Thus, the brace walls 226 increase the weight capacity of the apparatus 200 when the apparatus 200 is in either the ramp configuration or the load leveler configuration as previously described.

Referring back to FIG. 9, the apparatus 200 differs from the apparatus 100 in that the apparatus 200 includes truncated section 216 at end 201 and truncated section 217 at end 202. The truncated sections include at least one angled dimension across the one or more beam 220 of the apparatus 200. The beams 220 include a main section M1 between the two truncated sections 216, 217. The cross-section of each beam 220 is generally constant lengthwise along the main section M1. The side walls 221 have a height H1 along the main section M1. The bottom plates 223 of each beam 220 are also co-extensive with the main section M1. The side walls 221 taper in the height dimension in a direction away from the bottom plate 223 towards the top plate 222. Respective end plates 229, 230 are secured across the open portion of the beam 220 between the bottom plate 223 and the top plate 222. In an example, the end hook 211 is secured to the end plate 229 to form an end cap 232 and the end hook 212 is secured to the end plate 230 to form an end cap 234.

FIG. 11 is a cross-sectional view taken along line 11-11 of FIG. 9 to provide an example of a cross-section through the transition section 216. As shown in FIG. 11, the height H2 of the side walls 221 and that of the beams 220 as a whole is less than the height H1 of the side walls 221 of the beams 220 in the main section M1, as shown in FIG. 10. Furthermore, it can be seen that the brace walls 224 retain the same angular arrangement as shown in FIG. 10, but with the decreased height H2 between the top plate 222 and the end plate 229, the brace walls connect to the end plate 229 interior from side walls 221. In examples, the brace walls 224 may be secured to the end plate 229 by adhesive or another known manner of securement, while in other examples, the brace walls 224 movably rest upon the end plate 229. The end plate 229 may be secured to the beams by welding at the side walls, bottom plate 223 and the top plate 222. In further examples, a single end plate 229, 230 of a respective end cap 232, 234 extends across more than one beam 220.

The top plates 222 of the beams 220 continuously extend along the apparatus 200 from the first end 201 to the second end 202. That is, the top walls 222 extend along the main section M1 and the truncated sections 216, 217. Thus, when in the ramp configuration, the top walls 222 of the beams 220 of the apparatus 200 form a continuous surface in both a width dimension and in a length dimension. In an example, the top plates 222 of the beams 220 are provided with a continuous surface that extends across all beams. The continuous surface may be a grit surface as described above with respect to apparatus 100. In further examples, the continuous surface may be a punched or textured metal sheet that extends across one or more beams. In still other examples, cross treads 208 may be secured across one or more beams The beams 220 are formed with a non-corrosive metal, such as aluminum. Each beam 220 is formed as an extrusion. In the exemplary embodiment depicted, the apparatus 200 at least two beams 220 that are coupled together lengthwise in a side-by-side configuration. Thus, the apparatus 200 is formed with fewer individual members and welds than conventional combination ramp and load levelers. The apparatus 200 also has several other advantages over conventional combination ramp and load levelers including comparable strength with less metal, and thus lower overall weight per load capacity. In other examples, strengths, e.g. load capacity, may be achieved with an apparatus that is smaller in the vertical dimension compared to the aforementioned existing apparatus.

It will be recognized that the apparatus 100 and the apparatus 200 are but examples of the present disclosure and that features of these examples may be combined, removed, or interchanged between the examples while remaining within the scope of the present disclosure. The apparatus 300 may be used in the ramp configuration or in the load leveler configuration as described above, although for the present description, the ramp configuration will be used.

The apparatus and components thereof as described herein find numerous advantages over prior designs. The brace walls and beams that form a continuous apparatus surface provide improve strength in both a ramp configuration and a load leveler configuration. The brace walls help to transfer loads evenly across the beams and from the top plates of the beams to the bottom plates of the beams through the lateral walls, center walls, and brace walls.

In examples, the strength of the truss may require all of the separate beams work together, being solidly joined to one another. While welding may be needed to connect the beams, welding can weaken the beam material by annealing the metal. Therefore, welding within a channel formed by chamfered corners between the beams provides a space for the welding bead and a comparatively smooth weld surface. Exemplary tongue and groove joints maintain beam alignment while improving strength, load transfer, and resistance to twisting.

Further a system for ramp and/or load leveler construction that uses symmetry in design to provide two components e.g. beams and hooks which can be cut to dimensions and assembled to provide a variety of sizes and configurations of ramps and/or load levelers. In examples both the beam and the hook can be manufactured as extrusions and the components cut to the dimensions as needed. The configurations and designs disclosed herein provide the advantage of a ramp and/or load leveler construction with the same or greater strength with the same or less material, weight, and manufacturing time or cost.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ramp, the ramp comprising:
an extruded beam extending between a first end and a second end, the beam having:
a first plate extending from the first end to the second end, wherein the first plate is a top plate;
a second plate opposite the first plate and extending from the first end to the second end, wherein the second plate is a bottom plate;
a first side wall and a second side wall that each extend from the first end to the second end between the first plate and the second plate;
a first brace wall that extends from the bottom plate to the top plate and is angled from the first side wall interiorly in the direction of the second side wall; and
a second brace wall that extends from the bottom plate to the top plate and is angled from the second side wall interiorly in the direction of the first side wall, wherein the first and second brace walls meet at a midpoint of the top plate;
a first end piece secured about the first end and engaging at least one of the first plate or the second plate; and
a second end piece secured about the second end and engaging at least one of the first plate or the second plate.

2. The ramp according to claim 1, wherein the first end is orthogonal to the first plate and the second end is orthogonal to the first plate.

3. The ramp according to claim 1, wherein the first end piece is a first end hook and the second end piece is a second end hook.

4. The ramp of claim 1, wherein the first side wall comprises a tongue extending lengthwise along the first side wall outwardly away from the second side wall and the second side wall comprises a groove extending lengthwise along the second side wall.

5. The ramp of claim 4, wherein the tongue is of a first dimension to fit within a second dimension of the groove.

6. The ramp according to claim 1, further comprising a textured surface secured to the first plate.

7. The ramp according to claim 1, wherein the first plate comprises grooves that define ribs and the grooves further define dovetails into the ribs.

8. The ramp according to claim 7, further comprising a textured surface secured to the first plate, wherein the textured surface comprises an adhesive or an epoxy, and the adhesive or epoxy solidifies within the dovetails to form a mechanical connection between the textured surface and the first plate.

9. A ramp, the ramp comprising:
an extruded beam extending between a first end and a second end, the beam having:
a first plate extending from the first end to the second end;
a second plate opposite the first plate and extending from the first end to the second end;
a first side wall and a second side wall that each extend from the first end to the second end between the first plate and the second plate;
a first brace wall that extends from a first corner to the first plate, the first corner being between the second plate and the first side wall; and
a second brace wall that extends from a second corner to the first plate, the second corner being between the second plate and the second side wall;
a first end piece secured about the first end and engaging at least one of the first plate or the second plate;
a second end piece secured about the second end and engaging at least one of the first plate or the second plate; and
a center wall that extends between the first plate and the second plate, wherein the center wall is equidistant between the first side wall and the second side wall.

10. The ramp of claim 9, wherein the center wall is parallel to the first side wall and to the second side wall.

11. The ramp of claim 9, further comprising:
a third brace wall that connects to the first plate; and
a fourth brace wall that connects to the first plate.

12. The ramp of claim 11, further comprising:
the third brace wall extends from a third corner to the first plate, the third corner being between the center wall and the second plate;
the fourth brace wall extends from a fourth corner to the first plate, the fourth corner being between the center wall and the second plate.

13. The ramp of claim 12, further wherein the first brace wall connects to the third brace wall at the first plate and the second brace wall connects to the fourth brace wall at the first plate.

14. A ramp comprising:
first and second extruded beams that each extend between a first end and a second end, the beams each having:
a first plate, the first plate having an exterior textured surface;
a second plate opposite the first plate;
a groove wall extending between the first plate and the second plate, the groove wall comprising a groove extending into the groove wall lengthwise along an outside of the groove wall;
a tongue wall extending between the first plate and the second plate, the tongue wall comprising a tongue extending lengthwise along the first side wall outwardly from the tongue wall in a direction away from the groove wall;
a first brace wall that extends from the second plate to the first plate; and
a second brace wall that extends from the second plate to the first plate;
a first end piece that engages across the first ends of the first and second extruded beams;
a second end piece that engages across the second ends of the first and second extruded beams;
wherein the tongue of the first extruded beam is received within the groove of the second extruded beam to connect the first extruded beam to the second extruded beam in a lengthwise manner;
wherein the first extruded beam comprises a first chamfered exterior corner where the tongue wall of the first extruded beam connects to the second plate of the first extruded beam, and the second extruded beam comprises a second chamfered exterior corner where the groove wall of the second extruded beam connects to the second plate of the second extruded beam, and a weld joint secures the first extruded beam to the second extruded beam, the weld joint located between the first chamfered exterior corner and the second chamfered exterior corner.

15. The ramp of claim 14, wherein the first and second extruded beams each further comprise:
a center wall that extends between the first plate and the second plate, wherein the center wall is equidistant between the groove wall and the tongue wall;

a third brace wall that extends from a first corner to the first plate, the first corner being between the center wall and the second plate;

a fourth brace wall that extends from a second corner to the first plate, the second corner being between the center wall and the second plate;

wherein the first brace wall connects to the third brace wall at the first plate and the second brace wall connects to the fourth brace wall at the first plate.

16. The ramp of claim 14, wherein the first end piece comprises a first shelf that engages the second plates of the first and second extruded beams and the second end piece comprises a second shelf that engages the second plates of the first and second extruded beams.

17. The ramp of claim 14, wherein the exterior textured surfaces of the first and second extruded beams is a continuous textured surface across the respective first plates of the first and second extruded beams.

\* \* \* \* \*